United States Patent
Azuma

(10) Patent No.: US 10,746,352 B2
(45) Date of Patent: Aug. 18, 2020

(54) LUBRICANT COATING DEVICE AND IMAGE FORMING APPARATUS

(71) Applicant: KONICA MINOLTA, INC., Chiyoda-ku, Tokyo (JP)

(72) Inventor: Yukimasa Azuma, Machida (JP)

(73) Assignee: Konica Minolta, Inc., Tokyo (JP)

(*) Notice: Subject to any disclaimer, the term of this patent is extended or adjusted under 35 U.S.C. 154(b) by 328 days.

(21) Appl. No.: 15/952,121

(22) Filed: Apr. 12, 2018

(65) Prior Publication Data
US 2018/0328535 A1    Nov. 15, 2018

(30) Foreign Application Priority Data

May 10, 2017   (JP) .................................. 2017-094064

(51) Int. Cl.
*F16N 7/24*     (2006.01)
*B05B 15/00*    (2018.01)
*B05C 1/02*     (2006.01)
*F16N 15/00*    (2006.01)
*G03G 21/00*    (2006.01)

(52) U.S. Cl.
CPC ............. *F16N 7/24* (2013.01); *B05B 15/00* (2013.01); *B05C 1/02* (2013.01); *F16N 15/00* (2013.01); *G03G 21/0094* (2013.01)

(58) Field of Classification Search
CPC . F16N 7/24; F16N 15/00; B05B 15/00; B05C 1/02; G03G 21/0094
See application file for complete search history.

(56) References Cited

U.S. PATENT DOCUMENTS

| | | | | |
|---|---|---|---|---|
| 3,780,391 A | * | 12/1973 | Leenhouts | G03G 21/0035 15/1.51 |
| 5,655,203 A | * | 8/1997 | Thayer | G03G 21/0035 399/345 |
| 5,903,797 A | * | 5/1999 | Daniels | G03G 21/0005 399/34 |
| 2004/0035642 A1 | * | 2/2004 | Coder | H02G 1/086 184/15.1 |
| 2008/0170897 A1 | * | 7/2008 | Harada | F16N 7/24 399/346 |

(Continued)

FOREIGN PATENT DOCUMENTS

JP        2012-189709 A    10/2012

*Primary Examiner* — Michael A Riegelman
(74) *Attorney, Agent, or Firm* — Squire Patton Boggs (US) LLP

(57) ABSTRACT

A lubricant coating device preventing coating unevenness of lubricant powders is provided. The lubricant coating device includes a solid lubricant, a coating member and a film shaping member. The coating member in which first fibers composed of a material located on a positive polarity side and second fibers composed of a material located on a negative polarity side, on a triboelectric series with respect to the material of the solid lubricant are implanted, coats lubricant powders scraped off from the solid lubricant onto the image supporter. The film shaping member comes in contact with the image supporter and presses the lubricant powders onto the image supporter, to shape the lubricant powders into a form of a film. A scraping amount of the lubricant powders by the first fibers and a scraping amount of the lubricant powders by the second fibers are set to become substantially identical.

10 Claims, 5 Drawing Sheets

(56) References Cited

U.S. PATENT DOCUMENTS

| | | | | |
|---|---|---|---|---|
| 2009/0304423 A1* | 12/2009 | Ozaki | ............... | G03G 21/0094 399/346 |
| 2010/0021205 A1* | 1/2010 | Honjoh | .................... | F16N 7/24 399/123 |
| 2010/0202812 A1* | 8/2010 | Watanabe | .............. | G03G 21/00 399/346 |
| 2010/0316422 A1* | 12/2010 | Amemiya | .......... | G03G 21/0011 399/346 |
| 2011/0164909 A1* | 7/2011 | Nakane | ............... | G03G 21/007 399/346 |
| 2011/0229232 A1* | 9/2011 | Kojima | ............. | G03G 21/0094 399/346 |
| 2012/0266811 A1* | 10/2012 | Nakamura | ......... | G03G 21/0094 118/258 |
| 2014/0169851 A1* | 6/2014 | Saito | ................. | G03G 21/0094 399/346 |
| 2015/0153704 A1* | 6/2015 | Nishisaka | .......... | G03G 21/0094 399/346 |
| 2017/0275557 A1* | 9/2017 | Amemiya | ......... | C10M 169/041 |
| 2018/0328535 A1* | 11/2018 | Azuma | .................. | F16N 15/00 |
| 2019/0232695 A1* | 8/2019 | Azuma | ................... | B41J 29/38 |
| 2019/0232701 A1* | 8/2019 | Shimomura | ......... | B41M 5/0256 |

* cited by examiner

| | Material | Fineness [d] | Twisting property | Arrangement to rotation direction | Pushing amount [mm] | Implanting density [kF/inch²] | After printed 1000 sheets | | After printed 3000 sheets | |
|---|---|---|---|---|---|---|---|---|---|---|
| | | | | | | | Coating unevenness | Image density difference | Coating unevenness | Image density difference |
| Comparative example 1 | Nylon | 3 | Non twisted | Vertical | 1.0 | 180 | Existence | Existence | Existence | Existence |
| Comparative example 2 | Nylon | 3 | Non twisted | Vertical | 1.0 | 180 | Nonexistent | Existence | Existence | Existence |
| Example 1 | Fluororesin | 3 | Non twisted | Vertical | 1.0 | 180 | Nonexistent | Nonexistent | Nonexistent | Nonexistent |
| | Nylon | 10 | Non twisted | Vertical | 1.0 | 180 | Nonexistent | Nonexistent | Nonexistent | Nonexistent |
| | Fluororesin | 3 | twisted | Vertical | 1.0 | 180 | Nonexistent | Nonexistent | Nonexistent | Nonexistent |
| Example 2 | Nylon | 3 | Non twisted | Parallel | 1.0 | 180 | Nonexistent | Nonexistent | Nonexistent | Nonexistent |
| Example 3 | Fluororesin | 3 | Non twisted | Vertical | 1.0 | 180 | Nonexistent | Nonexistent | Nonexistent | Nonexistent |
| | Nylon | 3 | Non twisted | Vertical | 1.3 | 180 | Nonexistent | Nonexistent | Nonexistent | Nonexistent |
| Example 4 | Fluororesin | 3 | Non twisted | Vertical | 1.0 | 180 | Nonexistent | Nonexistent | Nonexistent | Nonexistent |
| Example 5 | Nylon | 3 | Non twisted | Vertical | 1.0 | 225 | Nonexistent | Nonexistent | Nonexistent | Nonexistent |
| | Fluororesin | 3 | Non twisted | Vertical | 1.0 | 225 | Nonexistent | Nonexistent | Nonexistent | Nonexistent |

FIG. 8

LUBRICANT COATING DEVICE AND IMAGE FORMING APPARATUS

CROSS-REFERENCE TO RELATED APPLICATION

The entire disclosure of Japanese Patent Application No. 2017-094064, filed on May 10, 2017, is incorporated herein by reference in its entirety.

BACKGROUND

1. Technological Field

The present invention relates to a lubricant coating device and an image forming apparatus.

2. Description of the Related Art

Conventionally, in image forming apparatuses using an electrophotographic process, as methods of removing toner (residual toner) remaining on an image supporter such as a photoreceptor after a toner image on the image supporter has been transferred, a method of scraping the residual toner with a cleaning blade has been proposed. On the other hand, in recent years, from viewpoints of making image quality high, techniques to make toner particles small in size and spherical in shape have been advanced. However, as toner particles are made smaller, the adhesion force of the toner particles to the image supporter becomes stronger, and as toner particles are made spherical, toner particles become easy to rotate between the image supporter and the cleaning blade. For this reason, with the smaller size and the spherical shape in toner particles, it becomes more difficult to remove residual toner.

Then, in recent years, in order to make it easy to remove residual toner with the cleaning blade, various techniques to supply lubricant powder to reduce frictional coefficient onto the image supporter have been proposed. For example, a technique has been disclosed that makes lubricant powder charged to a reverse polarity to the charged polarity of the image supporter before supplying the lubricant powder and makes it easy to supply electrostatically the charged lubricant powder to the image supporter. See Japanese Patent Publication No. 2012-189709.

SUMMARY

However, in this technique, assumption is given for only a case where the polarity of the surface potential of the image supporter is uniform, and assumption is not given for a case where the polarity of the surface potential becomes different depending on the positions of the image supporter. In the transfer process in the image forming apparatus, since a voltage with the reverse polarity to the charged polarity of the image supporter is applied, electric charges with the reverse polarity to the charged polarity may be injected excessively into a portion of the image supporter to which toner has not adhered (a toner image has not been formed) (hereinafter, referred to as a "background portion"). For this reason, the polarity of the surface potential of the background portion may become the reverse polarity to the charged polarity. On the other hand, the polarity of the surface potential of a portion of the image supporter to which toner has adhered (hereinafter, referred to as an "image portion"), still remains the same polarity as the charged polarity. Therefore, in the coating process of lubricant powder after the transfer process, lubricant powders charged to the reverse polarity to the charged polarity are attracted electrostatically to the image portion, but, repelled electrostatically from the background portion. As a result, there is a problem that coating unevenness of the lubricant powders occurs on the image supporter.

Moreover, even in the case where both the lubricant powders charged to the reverse polarity to the charged polarity of the image supporter and the lubricant powders charged to the same polarity with the charged polarity of the image supporter are supplied to the image supporter, in the case where the supply amount of the lubricant powders of each polarity is different from each other, there is also a problem that coating unevenness of the lubricant powders cannot be prevented on the image supporter.

The present invention is achieved in view of the abovementioned problems. Therefore, an object of the present invention is to provide a lubricant coating device and an image forming apparatus that prevent coating unevenness of lubricant powders even in the case where the polarity of the surface potential becomes different depending on the positions of an image supporter.

To achieve at least one of the abovementioned objects, according to an aspect of the present invention, a lubricant coating device reflecting one aspect of the present invention comprises a solid lubricant; a coating member in which first fibers composed of a material located on a positive polarity side on a triboelectric series with respect to the material of the solid lubricant and second fibers composed of a material located on a negative polarity side on the triboelectric series with respect to the material of the solid lubricant are implanted, and that comes in contact with an image supporter and coats lubricant powders scraped off from the solid lubricant onto the image supporter; and a film shaping member that comes in contact with the image supporter and presses the lubricant powders coated by the coating member onto the image supporter, to shape the lubricant powders into a form of a film; wherein a scraping amount of the lubricant powders by the first fibers and a scraping amount of the lubricant powders by the second fibers are set to become substantially identical.

The objects, features, and characteristics of this invention other than those set forth above will become apparent from the description given herein below with reference to preferred embodiments illustrated in the accompanying drawings.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 8 is a diagram showing a comparison result of Examples and Comparative examples.

DETAILED DESCRIPTION OF THE EMBODIMENTS

Figure 1:
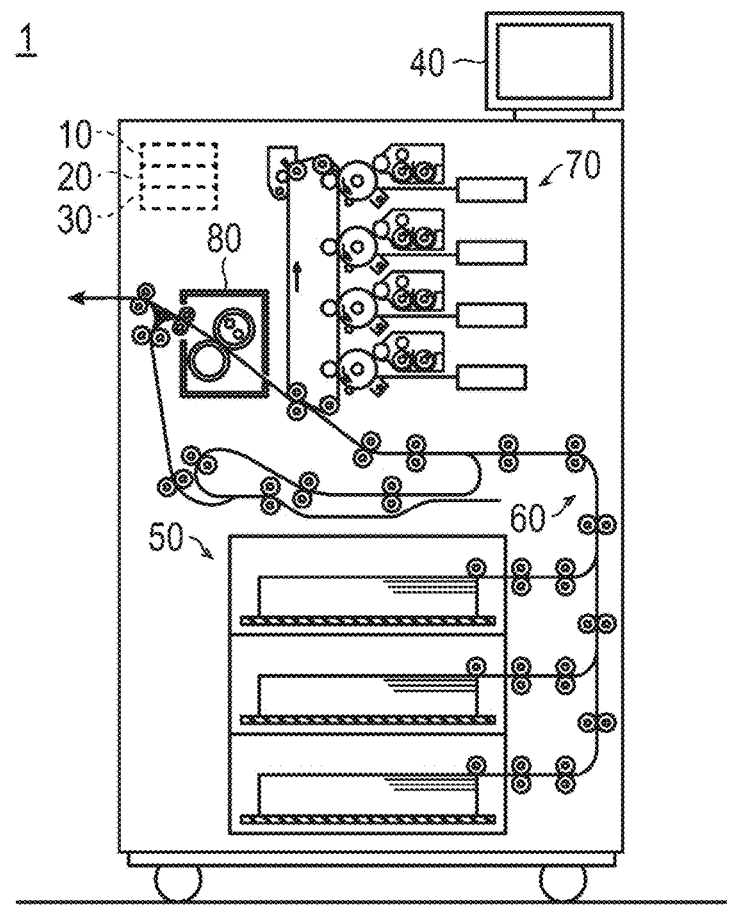
FIG. 1 is an illustration showing a schematic configuration of an image forming apparatus according to an embodiment of the present invention.

Hereinafter, one or more embodiments of the present invention will be described with reference to the drawings. However, the scope of the invention is not limited to the disclosed embodiments.

In the description of the drawings, the same elements are denoted by the same reference numerals, and redundant description is omitted. In addition, in some cases, dimensional ratios in the drawings are exaggerated and different from actual ratios for convenience of the description.

First, a schematic configuration of an image forming apparatus is described.

FIG. 1 is an illustration showing a schematic configuration of an image forming apparatus according to an embodiment of the present invention.

As shown in FIG. 1, an image forming apparatus 1 comprises a processor 10, a memory 20, a communicator 30, an operation panel 40, a paper feeder 50, a conveyor 60, an image former 70, and a fixer 80. These are connected with each other through buses for exchanging signals.

The processor 10 is a CPU (Central Processing Unit), and executes control for each of the above elements and various kinds of arithmetic processing in accordance with programs.

The memory 20 includes a ROM (Read Only Memory) for storing various programs and various kinds of data in advance, a RAM (Random Access Memory) serving as a work area for temporarily storing programs and data, a hard disk for storing various programs and various kinds of data, or the like.

The communicator 30 is an interface for communicating with other devices, such as a user's PC (Personal Computer), through networks, such as LAN. The communicator 30 receives, for example, a print job from a user's PC.

The operation panel 40 comprises a touch panel, a numeric keypad, a start button, a stop button, and the like, and is used for displaying variety kinds of information and inputting various kinds of instructions.

The paper feeder 50 comprises a plurality of paper feed trays for storing paper (paper sheets) serving as recording materials used for printing, and feeds paper stored in one of the paper feed trays one by one.

The conveyor 60 comprises conveyance paths, a plurality of conveyance roller pairs arranged along the conveyance paths, and a driving motor (not illustrated) for driving the conveyance roller pairs, and conveys paper fed from the paper feeder 50 to the image former 70, and the fixer 80 located on the downstream side of the image former 70.

The image former 70 forms images on paper on the basis of image data included in a print job by using well-known image forming processes, such as an electrophotographic process including respective processes of charging, exposing, developing, and transferring. The image former 70 comprises image forming units for forming images with toner of respective colors of yellow, magenta, cyan, and black, and an intermediate transfer unit composed of an endless belt wound around a plurality of rollers and supported so as to be capable of running. The details of the image former 70 will be mentioned later with reference to FIG. 2.

The fixer 80 comprises a pressure roller and a heat roller, and presses and heats paper on which an image is formed by the image former 70, thereby thermally fixing the image on the paper.

Next, a schematic configuration of the image former 70 is described. As mentioned above, the image former 70 comprises the image forming units for respective colors, but, since the image forming units for respective colors have substantially the same configuration, hereinafter, description is given by paying attention to one image forming unit.

Figure 2:
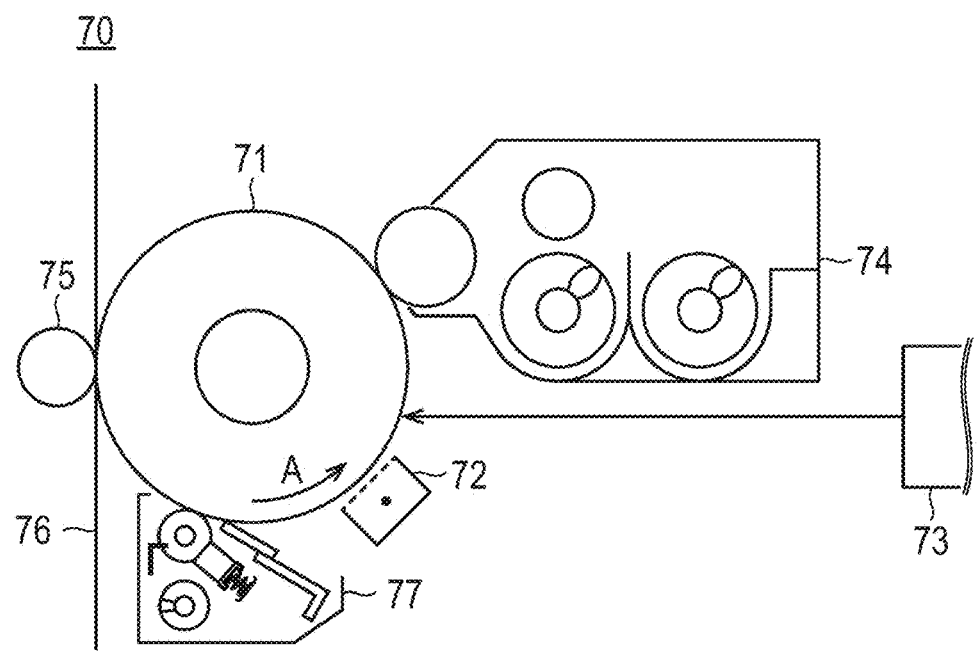
FIG. 2 is an illustration showing a schematic configuration of an image former.

FIG. 2 is an illustration showing a schematic configuration of an image former.

The image former 70 comprises a photoreceptor drum 71, a charging device 72, an exposing device 73, a developing device 74, a transfer device 75, an intermediate transfer unit 76, and a lubricant coating device 77.

The photoreceptor drum (image supporter) 71 is a drum-shaped image supporter including an organic photoreceptor in which a photosensitive layer composed of resin containing an organic photoconductor is formed on the outer periphery of a drum-shaped metal base body. As shown in FIG. 2, the photoreceptor drum 71 rotates at a predetermined speed in the direction of an arrow A. Examples of the resin constituting the photosensitive layer include a polycarbonate resin, a silicone resin, a polystyrene resin, an acrylic resin, a methacrylic resin, an epoxy resin, a polyurethane resin, a vinyl chloride resin, a melamine resin.

The charging device 72 comprises an electrostatic charger, or the like, and is disposed around the photoreceptor drum 71, and uniformly charges the surface of the photoreceptor drum 71 to a prescribed electric potential.

The exposing device 73 exposes with a laser, or the like, the surface of the photoreceptor drum 71 charged by the charging device 72, and forms an electrostatic latent image corresponding to image data on the surface of the photoreceptor drum 71.

The developing device 74 visualizes the electrostatic latent image formed by the exposing device 73, by using developer containing toner. The developing device 74 comprises a developing sleeve arranged so as to face the photoreceptor drum 71 through a developing region. To the developing sleeve, for example, a direct-current (DC) development voltage with the same polarity as the charging polarity of the charging device 72, or a development bias in which a DC voltage with the same polarity as the charging polarity of the charging device 72 is superimposed on an alternating-current (AC) voltage is applied. The developing device 74 performs reversal development for making toner adhere to an electrostatic latent image, and forms a toner image on the surface of the photoreceptor drum 71.

The transfer device 75 transfers a toner image having been formed by the developing device 74 and conveyed by the rotation of the photoreceptor drum 71, to the intermediate transfer unit 76. The transfer device 75 comprises a transfer roller arranged so as to face the photoreceptor drum 71 through a transfer region. To the transfer roller, a voltage of the reverse polarity to the charged polarity of toner is applied. The transfer device 75 transfers the toner image on the photoreceptor drum 71 by attracting electrostatically the toner image to the intermediate transfer unit 76.

The intermediate transfer unit 76 conveys the toner image transferred by the transfer device 75 to a secondary transfer region (not illustrated), and transfers the toner image onto a paper sheet.

The lubricant coating device 77 removes residual toner on the photoreceptor drum 71 that remains without being transferred to the intermediate transfer unit 76 by the transfer device 75, and applies (coats) lubricant powders. That is, the lubricant coating device 77 operates also as a cleaning device. The details of the lubricant coating device 77 are mentioned later with reference to FIG. 3.

After the residual toner has been removed and the lubricant powders have been applied by the lubricant coating device 77, the photoreceptor drum 71 is repeatedly subjected to the charging by the charging device 72, the formation of electrostatic latent images by the exposing device 73, the formation of toner images by the developing device 74, and the like.

In succession, the schematic configuration of the lubricant coating device 77 is described.

Figure 3:
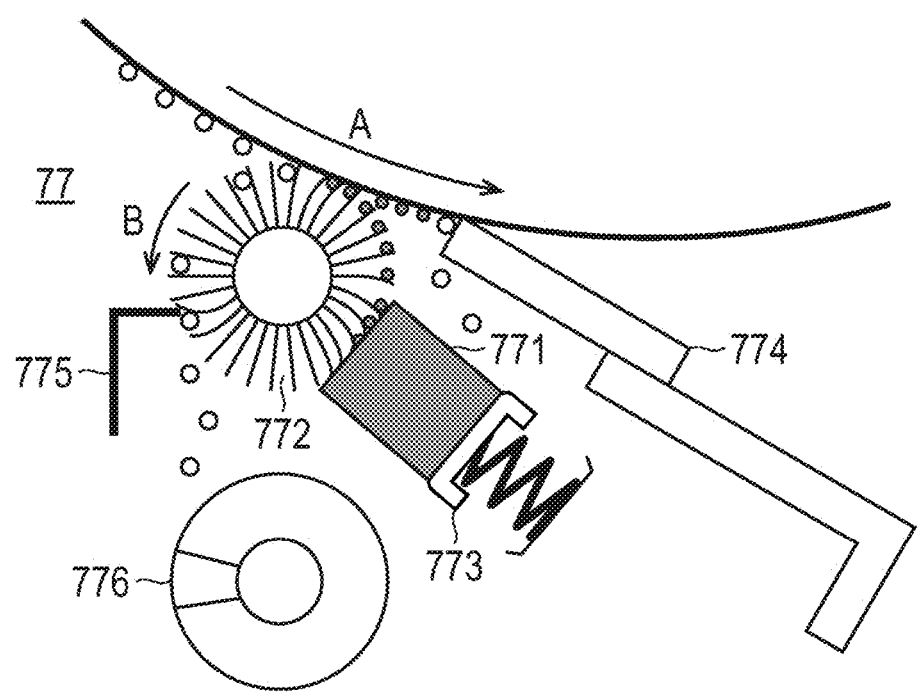
FIG. 3 is an illustration showing a schematic configuration of a lubricant coating device.
Figure 4:
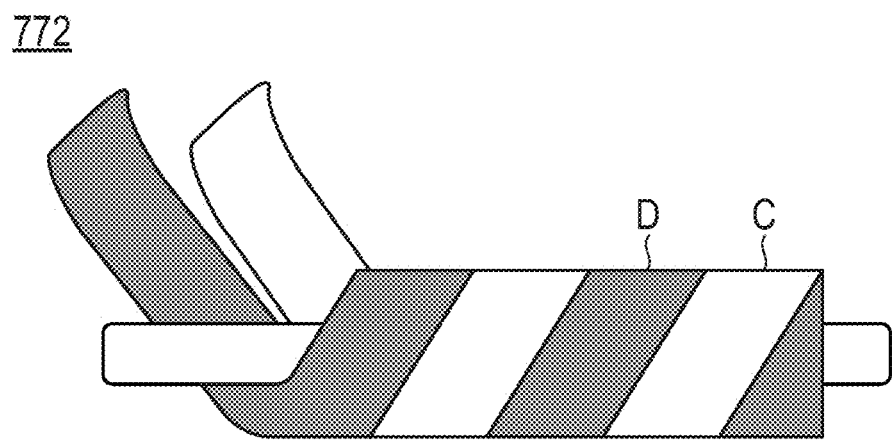
FIG. 4 is an illustration showing a schematic configuration of a coating brush.

FIG. 3 is an illustration showing a schematic configuration of a lubricant coating device. FIG. 4 is an illustration showing a schematic configuration of a coating brush.

As shown in FIG. 3, the lubricant coating device 77 comprises a solid lubricant 771, a coating brush 772, a pressing member 773, a film shaping member 774, a flicker member 775, and a recovery screw 776.

The solid lubricant 771 is produced by melting and molding the powder of metallic soap. The materials of the solid lubricant 771 may be selected from materials that can be coated on the surface of the photoreceptor drum 71, can lower its surface energy, and can reduce the adhesion force of toner to the photoreceptor drum 71. Examples of the materials of the solid lubricant 771, i.e., examples of lubricant, include fatty acid metal salts and fluorine-based resins, and these materials may be used solely or in mixture of two or more kinds of them. The fatty acid of the fatty acid metal salts is preferably linear hydrocarbons, for example, is preferably myristic acid, palmitic acid, stearic acid, or oleic acid, and is still more preferably stearic acid. Examples of the metal include lithium, magnesium, calcium, strontium, zinc, cadmium, aluminum, cerium, titanium, and iron. Of these, zinc stearate, magnesium stearate, aluminum stearate, and iron stearate are preferable, and zinc stearate is the most preferable.

The coating brush (coating member) 772 is a roll-shaped brush member in which fibers composed of two different kinds of materials are implanted as brush hair on the outer periphery of a metal shaft. As shown in FIG. 4, each of base cloths C and D, in a state where fibers composed of respective materials are implanted, is wound alternately around the outer periphery of the shaft. A period at which the base cloths C and D alternately appear in the axial direction of the coating brush 772 can be controlled by changing the width, winding angle, or the like, of each of the base cloths. It is preferable to constitute such that the base cloths C and D alternately appear at least one time at any arbitrary position in the axial direction. Moreover, the fibers on each of the base cloths C and D may be implanted as loop bundles in each of which a plurality of fibers are bundled so as to have a loop form. The details of the material to constitute the brush hair of the coating brush 772 are mentioned later.

As shown in FIG. 3, the coating brush 772 comes in contact with the photoreceptor drum 71, and conveys and coats the lubricant powders (indicated with black circles in FIG. 3) scraped off from the solid lubricant 771 onto the photoreceptor drum 71. Moreover, since the coating brush 772 rotates while bringing brush hair in contact with the photoreceptor drum 71, the coating brush 772 removes residual toner (indicated with white circles in FIG. 3) from the photoreceptor drum 71 while coating lubricant powders.

However, since the coating brush 772 can remove only a part of the residual toner from the photoreceptor drum 71, the remaining residual toner is removed by the film shaping member 774 mentioned later. The coating brush 772 conveys the residual toner removed from the photoreceptor drum 71 to the position of the flicker member 775 mentioned later.

As shown, for example, in FIG. 3, the coating brush 772 rotates at a predetermined speed in the direction of an arrow B being a counter direction (a direction in which its surface moves in a reverse direction) to the rotation direction of the photoreceptor drum 71. The coating brush 772 may rotate in a with direction (a direction in which its surface moves in the same direction) to the rotation direction of the photoreceptor drum 71. However, in order to remove as much residual toner as possible from the photoreceptor drum 71, the coating brush 772 may preferably rotate in the counter direction.

The pressing member 773 holds the solid lubricant 771, and pushes it with pressure toward the coating brush 772. The pressing member 773 comprises, for example, the holding member for holding the solid lubricant 771, and an elastic member, such as a compression spring, for pushing with pressure the solid lubricant 771 toward the coating brush 772 through the holding member. The end of the elastic member is fixed to the side wall (not illustrated) of the lubricant coating device 77, or the like.

The film shaping member 774 is composed of an elastic body, such as polyurethane rubbers processed in the shape of a sheet, is configured to come in contact with the photoreceptor drum 71, and presses the lubricant powders coated by the coating brush 772 against the photoreceptor drum 71, thereby shaping the lubricant powders into the form of a film. Moreover, the film shaping member 774 removes residual toner from the photoreceptor drum 71 while shaping lubricant powders into the form of a film. That is, the film shaping member 774 functions also as a cleaning blade that removes residual toner. In this connection, the image former 70 may comprise the film shaping member for shaping lubricant powders into the form of a film, and the cleaning blade for removing residual toner as the respective separate members. In this case, in the move direction of the photoreceptor drum 71, it is preferable to arrange the cleaning blade on the upstream side of the contact position of the coating brush 772.

The flicker member 775 is composed of, for example, a rigid body, such as metal processed in the shape of a flat plate, and removes the residual toner conveyed by the rotation of the coating brush 772 from the coating brush 772. The flicker member 775 is arranged so as to come in contact with the brush hair of the coating brush 772, displaces the brush hair greatly, and thereafter, releases the displaced brush hair. With this, the flicker member 775 generates restoring force on the brush hair to flip off residual toner, thereby removing the residual toner from the coating brush 772.

The recovery screw 776 recovers the toner removed from the photoreceptor drum 71 by the film shaping member 774 and the toner removed from the brush hair of the coating brush 772 by the flicker member 775, and discharges them to the outside of the lubricant coating device 77. The recovery screw 776 is located under the film shaping member 774 and the flicker member 775, and recovers the toner falling by its own weight. The recovery screw 776 conveys the recovered toner to, for example, a recovery container (not illustrated) arranged in an arbitrary space in the image forming apparatus 1.

(Material of the Brush Hair of the Coating Brush)

Figure 5:
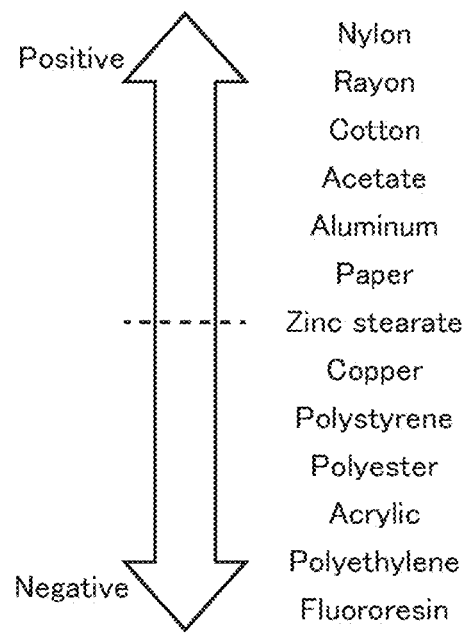
FIG. 5 is a diagram showing an example of a triboelectric series of materials.

In continuation, with reference to FIG. 5, description is given for the material to constitute the brush hair of the coating brush 772.

FIG. 5 is a diagram showing an example of a triboelectric series (or, electrification rank) of material.

In the present embodiment, as the material to constitute the brush hair of the coating brush 772, materials that can triboelectrically charge lubricant powders scraped off from the solid lubricant 771 to a desired polarity are selected. The term "triboelectric charging" is referred to a phenomenon in which charge transfer between two different kinds of materials occurs due to friction between the materials and one of the materials is charged to positive polarity and the other is charged to negative polarity. The triboelectric series shown in FIG. 5 is a rank showing whether material subjected to friction tends to be triboelectrically charged to positive polarity or negative polarity. In the triboelectric series, the material located nearer to the positive-polarity side is easily charged to positive polarity, and the material located nearer to the negative-polarity side is easily charged to negative polarity. For example, in the case where nylon and fluororesin are rubbed with each other, the nylon can be charged to positive polarity and the fluororesin can be charged to negative polarity. In the case where the materials located nearer to each other on the triboelectric series are rubbed with each other, a charge amount becomes comparatively small, and in the case where the materials located far away from each other on the triboelectric series are rubbed with each other, a charge amount tends to become comparatively large.

In the present embodiment, the coating brush 772 includes, as brush hair, fibers (first fibers) composed of a material located on the positive-polarity side on the triboelectric series with respect to the material of the solid lubricant 771, and fibers (second fibers) composed of a material located on the negative-polarity side on the triboelectric series with respect to the material of the solid lubricant 771. When the lubricant powders are scraped off from the solid lubricant 771, the lubricant powders are rubbed with the brush hair. That is, in the case where the lubricant powders are scraped by the fibers composed of a material located on the positive-polarity side on the triboelectric series with respect to the material of the solid lubricant 771, the lubricant powders are charged to negative polarity, and in the case where scraped by the fibers composed of a material located on the negative-polarity side on the triboelectric series with respect to the material of the solid lubricant 771, the lubricant powders are charged to positive polarity.

For example, in the case where the solid lubricant 771 is composed of zinc stearate, the coating brush 772 may include, as brush hair, fibers composed of nylon (hereinafter, referred to as "nylon fibers") and fibers composed of fluororesin (hereinafter, referred to as "fluororesin fibers"). The nylon fibers are located far away to the positive-polarity side on the triboelectric series with respect to the zinc stearate, and the fluororesin fibers are located far away to the negative-polarity side on the triboelectric series with respect to the zinc stearate. In this case, the coating brush 772 can supply lubricant powders charged to the positive polarity with a large charge amount and lubricant powders charged to the negative polarity with a large charge amount, to the photoreceptor drum 71. However, the materials to constitute the brush hair of the coating brush 772 are not limited to this example. The coating brush 772 may include, for example, fibers composed of rayon and fibers composed of polyethylene as brush hair.

(Scraping Amount of Lubricant Powders by a Coating Brush)

As mentioned above, in the present embodiment, the coating brush 772 includes fibers composed of two different kinds of materials as brush hair so as to triboelectrically charge the lubricant powders to different polarities. The fibers composed of different materials have different frictional coefficients with respect to the solid lubricant 771, and scrapes off the lubricant powders in the respective different amounts from the solid lubricant 771.

For example, the frictional coefficient of the nylon fibers is larger than the frictional coefficient of the fluororesin fibers. Therefore, in the case where the coating brush 772 includes the nylon fibers and the fluororesin fibers as brush hair, if the stiffness and the like of each of the fibers are equivalent, the scraping amount of lubricant powders per one nylon fiber is more than the scraping amount of lubricant powders per one fluororesin fiber. That is, the supply amount of the lubricant powders scraped by the nylon fibers and charged to the negative polarity becomes more than the supply amount of the lubricant powders scraped by the fluororesin fibers and charged to the positive polarity. On the photoreceptor drum 71, the lubricant powders charged to the positive polarity is electrostatically attracted to image portions, and the lubricant powders charged to the negative polarity is electrostatically attracted to background portions. Accordingly, when the supply amount of the lubricant powders with the positive polarity and the supply amount of the lubricant powders with the negative polarity are different from each other, coating unevenness of the lubricant powders occurs between the image portions and the background portions.

Then, in order to prevent the coating unevenness of the lubricant powders, it is necessary to set such that the scraping amount of lubricant powders by the first fibers and the scraping amount of lubricant powders by the second fibers become substantially the same. Hereinafter, on the basis of an example of a case where the coating brush 772 includes the nylon fibers and the fluororesin fibers as brush hair, description is given for several methods for making the scraping amount of lubricant powders by each of the fibers substantially the same.

(1) Setting of the Stiffness of Fibers

As the stiffness of fibers is higher, the contact pressure of the fibers against the solid lubricant 771 becomes higher and the friction force can be made larger, therefore the fibers can scrape off more lubricant powders. Accordingly, in the coating brush 772, by increasing the stiffness of the fluororesin fibers, it becomes possible to set such that the scraping amount of the lubricant powders by each of the nylon fibers and the fluororesin fibers becomes substantially the same. Alternatively, by decreasing the stiffness of the nylon fibers, it may be set such that the scraping amount of the lubricant powders by each of the nylon fibers and the fluororesin fibers becomes substantially the same.

In order to increase the stiffness of the fluororesin fibers, for example, the fineness of the fluororesin fibers may be increased. On the other hand, in order to decrease the stiffness of the nylon fibers, for example, the fineness of the nylon fibers may be decreased. The unit of fineness is, for example, denier (d).

Moreover, in order to increase the stiffness of fluororesin fibers, for example, a loop bundle of the fluororesin fibers may be made into a twisted bundle in which one or more twists (torsion) are added to the loop bundle. By making the loop bundle into the twisted bundle, since multiple fibers are restricted and become difficult to deform, the stiffness of the fibers increases. In this case, it is preferable to make the loop bundle of the nylon fibers into a non-twisted bundle in which twists are not added. In this connection, the method for controlling the stiffness of fibers is not limited to these examples.

(2) Setting of the Orientation of the Loop Surface of Fibers

As an angle formed by a loop surface formed by a loop bundle of fibers and the rotation direction of the coating brush 772 (a direction orthogonal to an axial direction) is nearer to vertical, the loop bundle of fibers can come in contact with the solid lubricant 771 more widely, therefore the loop bundle can scrape off more lubricant powders. Hereinafter, with reference to FIG. 6, description is given for the relationship between the loop surface of fibers and the rotation direction of the coating brush 772.

Figure 6:
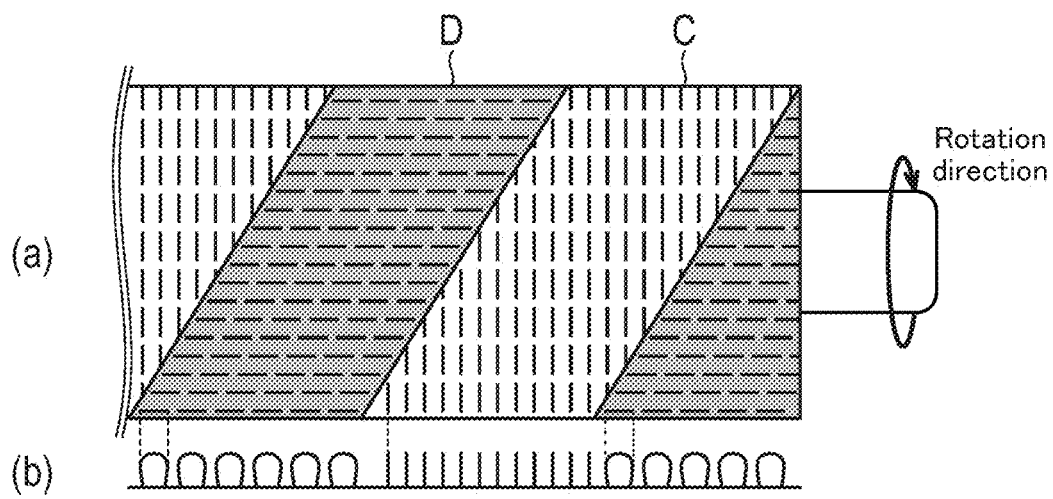
FIG. 6 is an illustration for explaining a relationship between loop surface of fibers and rotation direction of a coating brush.

FIG. 6 is an illustration for explaining a relationship between loop surface of fibers and rotation direction of a coating brush.

A part (a) in FIG. 6 is a front view showing a part of the coating brush 772 where loop bundles of fibers are arranged in array, and a part (b) is a bottom view with respect to the front view of the part (a), i.e., shows a cross sectional view of the loop bundles of the part (a). In the example shown in FIG. 6, the loop surfaces of fibers on the base cloth C are arranged in parallel to the rotation direction of the coating brush 772, and the loop surfaces of fibers on the base cloth D are arranged in vertical to the rotation direction of the coating brush 772. In this case, since the fibers on the base cloth C come in line contact with the solid lubricant 771, these fibers cannot scrape more lubricant powders. On the other hand, since the fibers on the base cloth D come in surface (loop surface) contact with the solid lubricant 771, these fibers can scrape more lubricant powders than the fibers on the base cloth C. In this connection, the number and arrangement of the loop bundles of fibers on each of the base cloths are not limited to the example shown in FIG. 6.

Therefore, like the base cloth D in FIG. 6, the fluororesin fibers may be implanted on the coating brush 772 such that the angle formed by the loop surface of the fibers and the rotation direction of the coating brush 772 is made to become near to vertical. Moreover, like the base cloth C of FIG. 6, the nylon fibers may be implanted on the coating brush 772 such that the angle formed by the loop surface of the fibers and the rotation direction of the coating brush 772 is made to become far away from vertical (near to parallel). With this, the scraping amount of the lubricant powders by each of the nylon fibers and the fluororesin fibers can be set to become substantially the same.

(3) Setting of the Pushing Amount of Fibers

As fibers are strongly pushed more into the solid lubricant 771, the fibers can scrape off more lubricant powders. Therefore, in the coating brush 772, by increasing the pushing amount of the fluororesin fibers into the solid lubricant 771, the scraping amount of the lubricant powders by each of the nylon fibers and the fluororesin fibers can be set to become substantially the same. Alternatively, by decreasing the pushing amount of the nylon fibers into the solid lubricant 771, the scraping amount of the lubricant powders by each of the nylon fibers and the fluororesin fibers may be set to become substantially the same.

Here, the term "pushing amount" means an amount of distance by which, on a design drawing, the coating brush 772 is further moved to approach to the surface of the solid lubricant 771 from a position where the coating brush 772 is brought in contact with the surface of the solid lubricant 771 in a free state where its brush hair keeps the original form. In other words, the term "pushing amount" means a contact pressure load by an elastic member when the coating brush 772 in an initial state (unused state) becomes in a state of the pushing amount. Hereinafter, "the pushing amount into the solid lubricant 771" is also merely called a "pushing amount".

In order to increase the pushing amount of the fluororesin fibers, for example, the fiber length (pile length) of the fluororesin fibers may be increased. On the other hand, in order to decrease the pushing amount of the nylon fibers, for example, the fiber length of the nylon fibers may be decreased.

Moreover, in order to increase the pushing amount of the fluororesin fibers, for example, the thickness of the base cloth on which the fluororesin fibers are implanted, may be increased without changing the fiber length of the fluororesin fibers. On the other hand, in order to decrease the pushing amount of the nylon fibers, for example, the thickness of the base cloth on which the nylon fibers are implanted, may be decreased without changing the fiber length of the nylon fibers.

Moreover, in order to increase the pushing amount of the fluororesin fibers, for example, a shaft diameter of only a portion of a shaft on which the base cloth of the fluororesin fibers is wound up, may be increased without changing the fiber length of the fluororesin fibers. On the other hand, in order to decrease the pushing amount of the nylon fibers, for example, a shaft diameter of only a portion of a shaft on which the base cloth of the nylon fibers is wound up, may be decreased without changing the fiber length of the nylon fibers. In this connection, a method for controlling the pushing amount of fibers is not limited to these examples.

(4) Setting of the Implanting Density of Fibers

As the implanting density of fibers is higher, the fibers can scrape off more lubricant powders with the whole fibers. Therefore, in the coating brush 772, by increasing the implanting density of the fluororesin fibers, it becomes possible to set such that the scraping amount of the lubricant powders by each of the nylon fibers and the fluororesin fibers becomes substantially the same. Alternatively, by decreasing the implanting density of the nylon fibers, it may be set such that the scraping amount of the lubricant powders by each of the nylon fibers and the fluororesin fibers becomes substantially the same. The unit of implanting density is, for example, $F/inch^2$ which shows the number of fibers per square inch.

EXAMPLE

In order to confirm the effects for the coating unevenness of the lubricant powders by the coating brush 772 according to the present embodiment, experiments with regard to the setting of fibers were conducted. Hereinafter, the contents and results of the experiments will be described.

As the experiment machine, the digital printing system by Konica Minolta Co., Ltd. "bizhub PRESS C1070" was set up and used as follows. The experiments was conducted under an environment of a room temperature 10° C. and a relative humidity 15%.

(1) Photoreceptor Drum 71

As the photoreceptor drum 71, used was an organic photoreceptor in which a photosensitive layer having a thickness of 25 μm and composed of a polycarbonate resin was formed on the outer periphery of a drum-shaped metal base body composed of aluminum. The photoreceptor drum 71 was rotated at a speed of 400 mm/sec.

(2) Developing Device 74

As the developing device 74, used was a device that comprises a developing sleeve driven to rotate at a linear velocity of 600 mm/sec and performs reversal development with a two-component developer. As the two-component developer, used was a developer including toner that was manufactured by the emulsion polymerization method, had a volume average particle diameter of 6.5 μm, was composed of toner particles subjected to external addition treatment with fine particles of silica or titania, and had negative chargeability. Moreover, to the developing sleeve, applied was a bias voltage with the same polarity as the charged polarity of the photoreceptor drum 71.

(3) Intermediate Transfer Unit 76

As the intermediate transfer unit 76, used was an endless belt composed of a polyimide resin and provided with conductivity.

(4) Solid Lubricant 771

As the solid lubricant 771, used was one that was composed of zinc stearate.

(5) Coating Brush 772

As the coating brush 772, used were brushes each of which had a shaft diameter of 14 mm, and in which the respective fibers of Comparative examples 1 and 2 and Examples 1 to 5 described below were implanted as brush hair. The coating brush 772 was rotated in the same rotation direction as the rotation direction of the photoreceptor drum 71 at a speed with a linear velocity ratio of 1.35 to the photoreceptor drum 71.

Comparative Example 1

Only nylon fibers were used as brush hair. The fineness of the nylon fibers was set to 3 d, and the loop bundle of the nylon fibers was made into a non-twisted bundle. The loop surface of the nylon fibers was set to be vertical to the rotation direction of the coating brush 772. The pushing amount of the nylon fibers was set to 1.0 mm, and the implanting density of the nylon fibers was set to 180 kF/inch$^2$.

Comparative Example 2

Nylon fibers and fluororesin fibers were used as brush hair. The fineness of each of the fibers was set to 3 d, and the loop bundle of each of the fibers was made into a non-twisted bundle. The loop surface of each of the fibers was set to be vertical to the rotation direction of the coating brush 772. The pushing amount of each of the fibers was set to 1.0 mm, and the implanting density of each of the fibers was set to 180 kF/inch$^2$.

Example 1

Nylon fibers and fluororesin fibers were used as brush hair. The fineness of the nylon fibers was set to 3 d, and the fineness of the fluororesin fibers was set to 10 d. The loop bundle of each of the fibers was made into a non-twisted bundle. The loop surface of each of the fibers was set to be vertical to the rotation direction of the coating brush 772. The pushing amount of each of the fibers was set to 1.0 mm, and the implanting density of each of the fibers was set to 180 kF/inch$^2$.

Example 2

Nylon fibers and fluororesin fibers were used as brush hair. The fineness of each of the fibers was set to 3 d. The loop bundle of the nylon fibers was made into a non-twisted bundle, and the loop bundle of the fluororesin fibers was made into a twisted bundle. The loop surface of each of the fibers was set to be vertical to the rotation direction of the coating brush 772. The pushing amount of each of the fibers was set to 1.0 mm, and the implanting density of each of the fibers was set to 180 kF/inch$^2$.

Example 3

Nylon fibers and fluororesin fibers were used as brush hair. The fineness of each of the fibers was set to 3 d, and the loop bundle of each of the fibers was made into a non-twisted bundle. The loop surface of the nylon fibers was set to be parallel to the rotation direction of the coating brush 772, and the loop surface of the fluororesin fibers was set to be vertical to the rotation direction of the coating brush 772. The pushing amount of each of the fibers was set to 1.0 mm, and the implanting density of each of the fibers was set to 180 kF/inch$^2$. In this connection, the term "vertical" means "substantially vertical", and was set to an angle within ±10 degree with respect to perfect vertical. Moreover, the term "parallel" means "substantially parallel", and was set to an angle within ±10 degree with respect to perfect parallel.

Example 4

Nylon fibers and fluororesin fibers were used as brush hair. The fineness of each of the fibers was set to 3 d, and the loop bundle of each of the fibers was made into a non-twisted bundle. The loop surface of each of the fibers was set to be vertical to the rotation direction of the coating brush 772. The pushing amount of the nylon fibers was set to 1.0 mm, and the pushing amount of the fluororesin fibers was set to 1.3 mm. The implanting density of each of the fibers was set to 180 kF/inch$^2$.

Example 5

Nylon fibers and fluororesin fibers were used as brush hair. The fineness of each of the fibers was set to 3 d, and the loop bundle of each of the fibers was made into a non-twisted bundle. The loop surface of each of the fibers was set to be vertical to the rotation direction of the coating brush 772. The pushing amount of each of the fibers was set to 1.0 mm. The implanting density of the nylon fibers was set to 180 kF/inch$^2$, and the implanting density of the fluororesin fibers was set to 225 kF/inch$^2$.

(6) Film Shaping Member 774

As the film shaping member 774, used was one that was composed of a urethane rubber, and had an impact resilience coefficient of 50% under an environment of 25° C., a hardness of 70 measured by a type A durometer conforming to JIS K 6253, a thickness of 2 mm, a free length of 10 mm, and a width of 324 mm. The contact pressure load of the film shaping member 774 to the photoreceptor drum 71 was set to 20 N/m, and the contact angle was set to 15 degrees.

Figure 7:
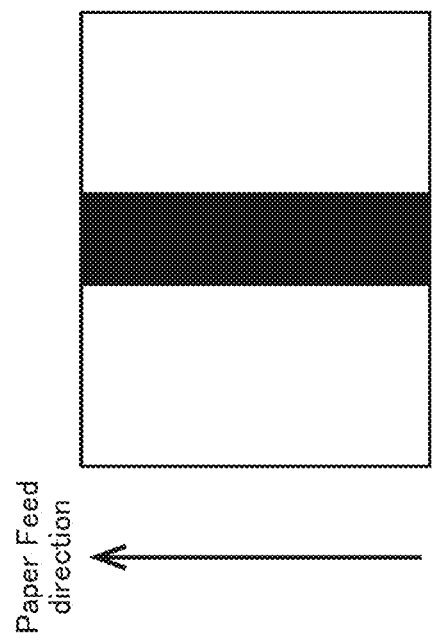
FIG. 7 is an illustration showing a longitudinal belt chart used in an experiment.

FIG. 7 is an illustration showing a longitudinal belt chart used in an experiments.

The longitudinal belt chart shown in FIG. 7 was made to be printed continuously by the experiment machine equipped with any one of the coating brushes 772 of Comparative examples 1 and 2 and Examples 1 to 5 on paper sheets with an A4 size in a landscape mode. At each time after the longitudinal belt chart was printed on 1000 paper sheets and 3000 paper sheets, the amount of lubricant on each of the image portion and the background portion of the photoreceptor drum 71 was measured. The amount of lubricant was substituted by the atomic composition percentage of zinc on the photoreceptor drum 71 detected by the X-ray photoelectron spectroscopy analysis apparatus, and it was determined whether a difference in atomic composition percentage of zinc between the image portion and the background portion (hereinafter, merely referred to as a "zinc ratio difference") is less than 0.7 at. % which is a predetermined threshold.

In the case where a zinc ratio difference between the image portion and the background portion is less than 0.7 at. %, it was determined that the coating unevenness of lubricant powders has not occurred. Moreover, in this case, it was determined that the supply amount of lubricant powders to each of the image portion and the background portion was substantially the same, namely, the scraping amount of lubricant powders by each of the nylon fibers and the fluororesin fibers was substantially the same.

On the other hand, in the case where a zinc ratio difference between the image portion and the background portion is equal to or more than 0.7 at. %, it was determined that the coating unevenness of lubricant powders has occurred. Moreover, in this case, it was determined that the supply amount of lubricant powders to each of the image portion and the background portion was not substantially the same, namely, the scraping amount of lubricant powders by each of the nylon fibers and the fluororesin fibers was not substantially the same.

At each time after the longitudinal belt chart was printed on 1000 paper sheets and 3000 paper sheets, as mentioned above, a zinc ratio difference was determined, and in addition, a half-tone image was printed on another paper sheet. Successively, in the printed half-tone image, it was determined whether a density difference between the respective portions corresponding to the image portion and the background portion (hereinafter, merely referred to as an "image density difference") occurs to an extent exceeding a permissible range.

In this regard, in Comparative Example 2 and Examples 1 to 5 which were mentioned above, each of the base cloths on which each of the fibers are implanted respectively, had the same width, and this width was set to about one quarter or less of the width of the longitudinal belt chart.

FIG. 8 is a diagram showing a comparison results of Examples and Comparative examples.

The coating brush 772 of Comparative example 1 used only the nylon fibers as brush hair, and supplied the lubricant powders charged to the negative polarity to the background portion, but, could not supply the lubricant powders charged to the positive polarity to the image portion. For this reason, as shown in FIG. 8, in Comparative example 1, in the early stage at the time of having printed 1000 paper sheets, the zinc ratio difference became 0.7 at. % or more, indicating coating unevenness. Moreover, the coating unevenness of the lubricant powders influenced the developing ability and transferring ability of the photoreceptor drum 71 so that the image density difference also exceeded the permissible range.

The coating brush 772 of Comparative example 2 used the nylon fibers and the fluororesin fibers as brush hair, and could supply the lubricant powders charged to the positive polarity and the lubricant powders charged to the negative polarity to the image portion and the background portion. For this reason, in Comparative example 2, at the time of having printed 1000 paper sheets, the coating unevenness of the lubricant powders did not occur, and also the image density difference was within the permissible range. However, since the scraping amount of the lubricant powders was different between the respective fibers, when 3000 paper sheets have been printed, the influence by the difference in the scraping ability became large, the coating unevenness of the lubricant powders has occurred, and the image density difference exceeded the permissible range.

On the other hand, in Examples 1 to 5, the coating unevenness of the lubricant powders did not occur at the time of having printed 3000 paper sheet, and also the image density difference was within the permissible range.

In the coating brush 772 of Example 1, for Comparative example 2, the fineness of the fluororesin fibers was increased. With this, the stiffness of the fluororesin fibers increased and the scraping amount of the lubricant powders by the fluororesin fibers increased. Accordingly, the scraping amount of the lubricant powders by each of the nylon fibers and the fluororesin fibers became substantially the same, whereby the coating unevenness and the image density difference have been improved.

In the coating brush 772 of Example 2, for Comparative example 2, the loop bundle of the fluororesin fibers was made into the twisted bundle. With this, the stiffness of the fluororesin fibers increased and the scraping amount of the lubricant powders by the fluororesin fibers increased. Accordingly, the scraping amount of the lubricant powders by each of the nylon fibers and the fluororesin fibers became substantially the same, whereby the coating unevenness and the image density difference have been improved.

In the coating brush 772 of Example 3, for Comparative example 2, the loop surface of the nylon fibers was set to be parallel to the rotation direction of the coating brush 772. With this, the scraping amount of the lubricant powders by the nylon fibers decreased. Accordingly, the scraping amount of the lubricant powders by each of the nylon fibers and the fluororesin fibers became substantially the same, whereby the coating unevenness and the image density difference have been improved.

In the coating brush 772 of Example 4, for Comparative example 2, the fiber length of the fluororesin fibers was increased. With this, the pushing amount of the fluororesin fibers increased, and the scraping amount of the lubricant powders by the fluororesin fibers increased. Accordingly, the scraping amount of the lubricant powders by each of the nylon fibers and the fluororesin fibers became substantially the same, whereby the coating unevenness and the image density difference have been improved.

In the coating brush 772 of Example 5, for Comparative example 2, the implanting density of the fluororesin fibers was increased. With this, the scraping amount of the lubricant powders by the fluororesin fibers increased. Accordingly, the scraping amount of the lubricant powders by each of the nylon fibers and the fluororesin fibers became substantially the same, whereby the coating unevenness and the image density difference have been improved.

As mentioned above, the lubricant coating device 77 comprises the coating brush 772 in which the fibers (the first fibers) composed of the material located on the positive-polarity side and the fibers (the second fibers) composed of the material located on the negative-polarity side, on the triboelectric series with respect to the material of the solid lubricant 771, are implanted. The scraping amount of the lubricant powders by the first fiber and the scraping amount of the lubricant powders by the second fibers are set to become substantially the same. With this, in the lubricant coating device 77, the scraping amount of the lubricant powders charged to the positive polarity and the scraping amount of the lubricant powders charged to the negative polarity can be set to become substantially the same. Therefore, even in the case where the polarity of the surface potential of an image portion and the polarity of the surface potential of a background portion on the photoreceptor drum 71 are different from each other, the lubricant coating device 77 can supply stably the lubricant powders charged to the positive polarity and the lubricant powders charged to the negative polarity to the photoreceptor drum 71, whereby it is possible to prevent the coating unevenness of the lubricant powders.

Moreover, in the lubricant coating device 77, the first fibers may be nylon fibers and the second fibers may be fluororesin fibers. With respect to the zinc stearate serving as the solid lubricant 771, the nylon fibers are located far away to the positive-polarity side on the triboelectric series, and the fluororesin fibers are located far away to the negative-polarity side on the triboelectric series. Therefore, the lubricant coating device 77 can supply the lubricant powders charged to the positive polarity with a large charge amount and the lubricant powders charged to the negative polarity with a large charge amount, to the photoreceptor drum 71.

Moreover, in the lubricant coating device 77, by making the stiffness of the fluororesin fibers larger than the stiffness of the nylon fibers, the scraping amount of the lubricant powders by each of the nylon fibers and the fluororesin fibers can be made substantially the same.

Moreover, in the lubricant coating device 77, by making the fineness of the fluororesin fibers larger than the fineness of the nylon fibers, the stiffness of the fluororesin fibers can be made larger than the stiffness of the nylon fibers.

Moreover, in the lubricant coating device 77, by making the loop bundle of the fluororesin fibers into a twisted bundle and making the loop bundle of the nylon fibers into a non-twisted bundle, the stiffness of the fluororesin fibers can be made larger than the stiffness of the nylon fibers.

Moreover, in the lubricant coating device 77, an angle formed by the loop surface formed by the loop bundle of the fluororesin fibers and the rotation direction of the coating brush 772 is made substantially vertical. Furthermore, an angle formed by the loop surface formed by the loop bundle of the nylon fibers and the rotation direction of the coating brush 772 is made substantially parallel. With this, the scraping amount of the lubricant powders by each of the nylon fibers and the fluororesin fibers can be made substantially the same.

Moreover, in the lubricant coating device 77, by making the pushing amount of the fluororesin fibers larger than the pushing amount of the nylon fibers, the scraping amount of the lubricant powders by each of the nylon fibers and the fluororesin fibers can be made substantially the same.

Moreover, in the lubricant coating device 77, by making the fiber length of the fluororesin fibers longer than the fiber length of the nylon fibers, the pushing amount of the fluororesin fibers can be made larger than the pushing amount of the nylon fibers.

Moreover, in the lubricant coating device 77, by making the implanting density of the fluororesin fibers higher than the implanting density of the nylon fibers, the scraping amount of the lubricant powders by each of the nylon fibers and the fluororesin fibers can be made substantially the same.

Moreover, the image forming apparatus 1 comprises the lubricant coating device 77. With this, even in the case where the polarity of the surface potential becomes different depending on the positions of the photoreceptor, the image forming apparatus 1 prevents the coating unevenness of the lubricant powders, and makes it easy to remove residual toner. Therefore, the image forming apparatus 1 can prevent the occurrence of the image noise and the like due to poor cleaning for toner.

With regard to the above-described configurations of each of the lubricant coating device 77 and the image forming apparatus 1, the description has been given for the main configurations in order to describe the features of the embodiment and the example, therefore the present invention is not limited to the above configurations. Furthermore, the configurations included in general lubricant coating devices and image forming apparatuses are not intended to be excluded.

For example, the coating brush 772 of the lubricant coating device 77 may be equipped with fibers made by combining arbitrarily two or more of Examples 1 to 5 as brush hair. That is, the coating brush 772 may include fluororesin fibers as brush hair in which the fineness is increased (Example 1), and, in addition, the loop bundle is made into a twisted bundle (Example 2). Alternatively, the coating brush 772 may include, as brush hair, the nylon fibers in which the loop surface is set to be parallel to the rotation direction of the coating brush 772 (Example 3) and the fluororesin fibers in which the fiber length and the implanting density are increased (Examples 4 and 5). With this, the coating brush 772 can be made to be not likely to receive the restriction on the design of brush hair, and the scraping amount of the lubricant powders by each of the nylon fibers and the fluororesin fibers can be made substantially the same.

Although embodiments of the present invention have been described and illustrated in detail, the disclosed embodiments are made for purposes of illustration and example only and not limitation. The scope of the present invention should be interpreted by terms of the appended claims.

What is claimed is:

1. A lubricant coating device, comprising:
   a solid lubricant;
   a coating member in which first fibers composed of a material located on a positive polarity side on a triboelectric series with respect to the material of the solid lubricant and second fibers composed of a material located on a negative polarity side on the triboelectric series with respect to the material of the solid lubricant are implanted, and that comes in contact with an image supporter and coats lubricant powders scraped off from the solid lubricant onto the image supporter; and
   a film shaping member that comes in contact with the image supporter and presses the lubricant powders coated by the coating member onto the image supporter, to shape the lubricant powders into a form of a film;
   wherein a scraping amount of the lubricant powders by the first fibers and a scraping amount of the lubricant powders by the second fibers are set to become substantially identical.

2. The lubricant coating device of claim 1, wherein the first fibers are nylon fibers, and the second fibers are fluororesin fibers.

3. The lubricant coating device of claim 2, wherein the fluororesin fibers have stiffness larger than the stiffness of the nylon fibers.

4. The lubricant coating device of claim 3, wherein the fluororesin fibers have fineness larger than the fineness of the nylon fibers.

5. The lubricant coating device of claim 3, wherein a plurality of fibers of the fluororesin fibers are bundled to have a loop form and implanted, as a twisted bundle in which twists are added, on the coating member, and wherein a plurality of fibers of the nylon fibers are bundled to have a loop form and implanted, as a non-twisted bundle in which twists are not added, on the coating member.

6. The lubricant coating device of claim 2, wherein the fluororesin fibers are implanted on the coating member such that an angle formed by a loop surface formed by a loop bundle of the fluororesin fibers and a rotation direction of the coating member is made to become substantially vertical, and wherein the nylon fibers are implanted on the coating member such that an angle formed by a loop surface formed by a loop bundle of the nylon fibers and a rotation direction of the coating member is made to become substantially parallel.

7. The lubricant coating device of claim 2, wherein the fluororesin fibers have a pushing amount into the solid lubricant larger than the pushing amount of the nylon fibers.

8. The lubricant coating device of claim 7, wherein the fluororesin fibers have a fiber length longer than the fiber length of the nylon fibers.

9. The lubricant coating device of claim 2, wherein the fluororesin fibers have an implanting density on the coating member higher than the implanting density of the nylon fibers.

10. An image forming apparatus, comprising an image former comprising:
  the image supporter; and
  the lubricant coating device of claim 1.

* * * * *